United States Patent [19]

Ryan et al.

[11] 4,278,072
[45] Jul. 14, 1981

[54] FORCED AIR SOLAR HEATING SYSTEM

[75] Inventors: Thomas L. Ryan; George T. Kalisz, both of Winslow, Ariz.

[73] Assignee: Rykal Solar Corporation, Winslow, Ariz.

[21] Appl. No.: 935,654

[22] Filed: Aug. 21, 1978

[51] Int. Cl.³ .................................................. F24J 3/02
[52] U.S. Cl. ..................................... 126/429; 126/437; 126/449; 126/450
[58] Field of Search ............... 126/428, 429, 430, 432, 126/434, 446, 449, 450, 419, 422

[56] References Cited

U.S. PATENT DOCUMENTS

| | | | |
|---|---|---|---|
| 1,889,238 | 11/1932 | Clark | 126/434 |
| 3,853,114 | 12/1974 | Gaydoes, Jr. | 126/450 X |
| 3,943,911 | 3/1976 | Yu | 126/450 |
| 3,987,784 | 10/1976 | Godrick | 126/450 X |
| 3,995,614 | 12/1976 | Cerra et al. | 126/450 |
| 4,007,728 | 2/1977 | Guba | 126/449 X |
| 4,062,346 | 12/1977 | Rapp, Jr. et al. | 126/430 |
| 4,076,013 | 2/1978 | Bette | 126/431 X |
| 4,090,494 | 5/1978 | Borst et al. | 126/450 X |
| 4,098,259 | 7/1978 | Barber, Jr. et al. | 126/450 X |
| 4,121,564 | 10/1978 | Schwartz | 126/450 X |
| 4,130,108 | 12/1978 | Patil | 126/449 X |
| 4,142,514 | 3/1979 | Newton | 126/450 X |
| 4,148,296 | 4/1979 | Parlato | 126/450 X |
| 4,154,223 | 3/1979 | Löf | 126/450 |
| 4,219,012 | 8/1980 | Bergen | 126/449 |

Primary Examiner—Allan N. Shoap
Attorney, Agent, or Firm—Claude A. S. Hamrick

[57] ABSTRACT

A forced air solar heating system including a solar panel unit having an elongated base member, a corrugated absorber member disposed over the base member, an end cap disposed over a first end of the base and absorber members, another cap disposed over the other end of the base and absorber members, a translucent cover positioned over the absorber member to form dead air space therebetween, an intake manifold coupled to an end cap of the solar panel unit, an output manifold coupled to the other end cap of the solar panel unit, a heat storage unit coupled to the output manifold, and a blower coupling the heat storage unit to the intake manifold for circulating air through the solar panel and heat storage unit.

10 Claims, 6 Drawing Figures

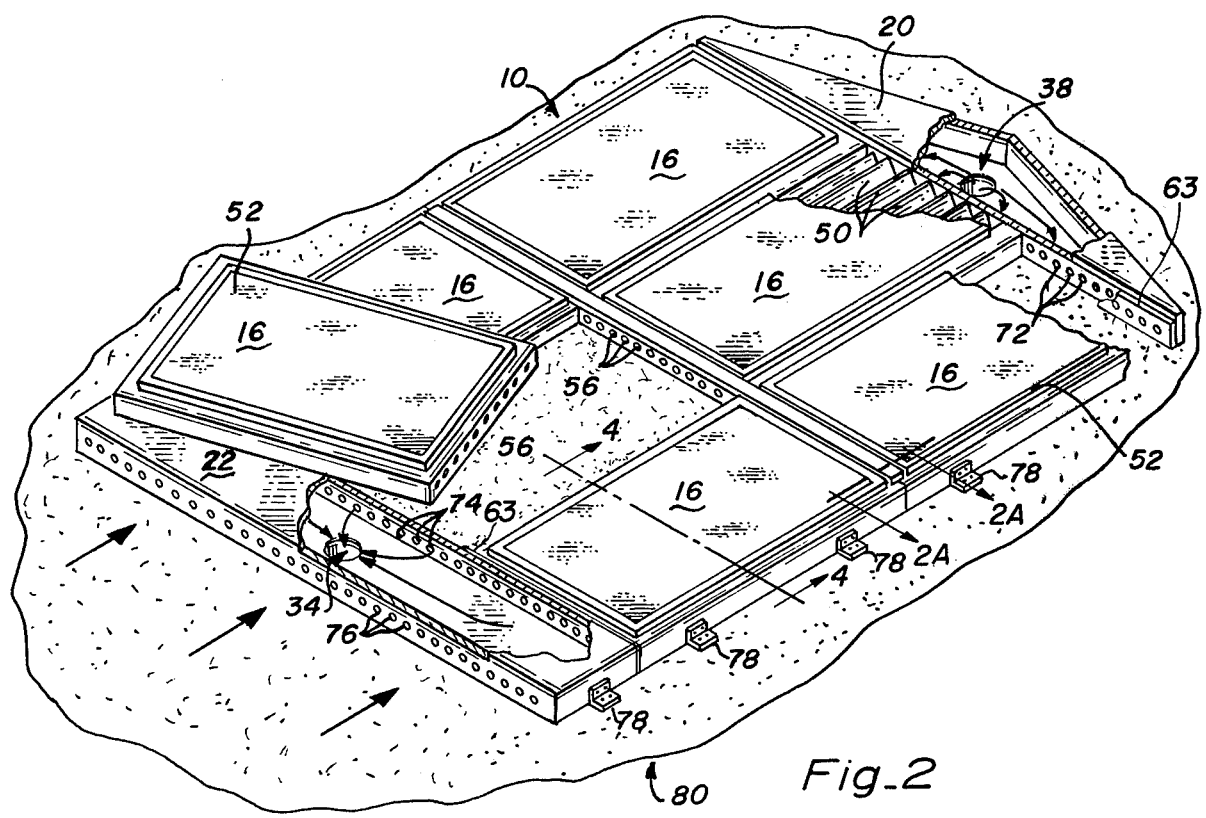
Fig_2
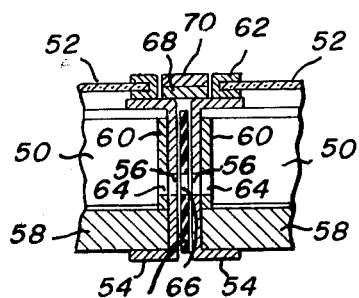
Fig_2A

U.S. Patent Jul. 14, 1981 Sheet 4 of 4 4,278,072
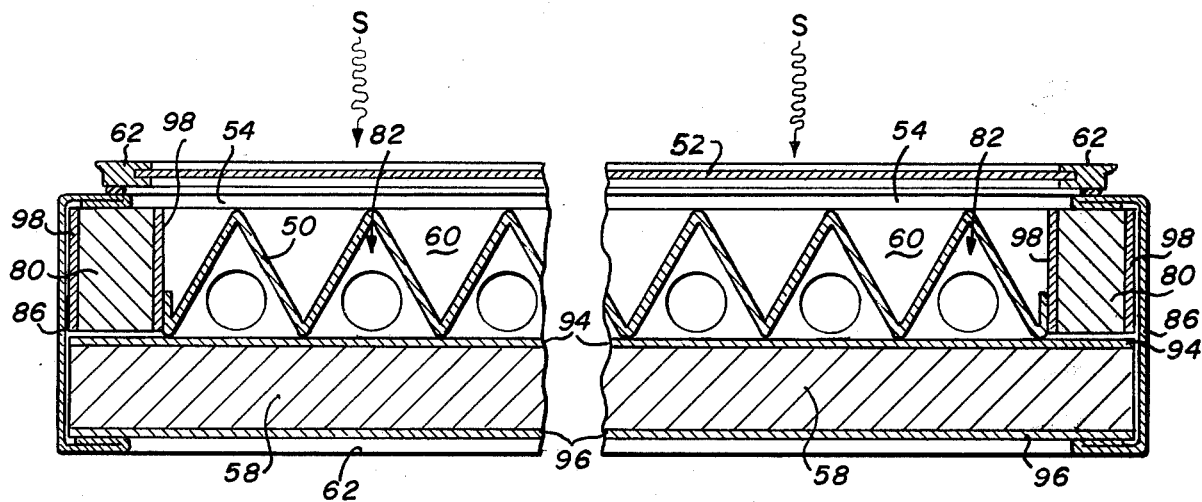
Fig_4
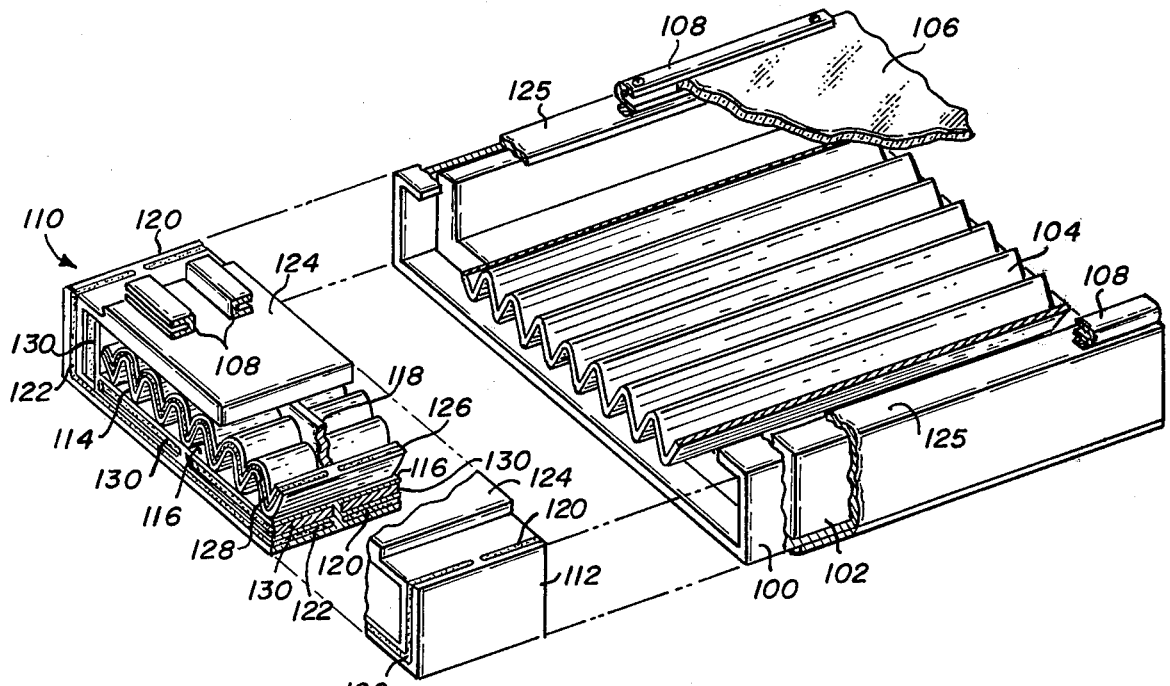
Fig_5

FORCED AIR SOLAR HEATING SYSTEM

BACKGROUND OF THE INVENTION

1. Field of the Invention

This invention relates generally to solar energy devices and more particularly to forced air solar heating systems.

2. Description of the Prior Art

Alternative energy sources, such as solar energy, have attracted much attention from energy consumers in recent years. Because solar energy is abundant and free for the taking, a great number of devices have been devised to trap, store and use solar energies.

In U.S. Pat. No. 1,258,405 of D. A. Harrison a solar heating apparatus is disclosed which includes a corrugated member which holds and positions a plurality of pipes for carrying a fluid and a translucent window covering the corrugated member. The fluid becomes heated by the sun, and is then used to perform some useful work.

U.S. Pat. No. 4,046,133 of T. E. Cook discloses a solar panel assembly including air channels formed transversely beneath a corrugated, diaphanous cover so that air circulated therethrough will absorb solar energy.

In U.S. Pat. No. 4,007,728 P. Guba teaches an apparatus for collecting radiant heat including a hollow member having a side panel with a substantially flat exterior surface, the side panel absorbing radiation incident to the surface and transferring the heat therefrom to a fluid (such as air) passing through the member.

Finally, L. W. Brantley, Jr. teaches in U.S. Pat. No. 3,951,129 a solar energy panel including a solid, corrugated absorber member having a plurality of tubular bores longitudinally formed therethrough for passing an energy absorbing fluid. The fluid is used for transferring thermal energy from the solar energy panel to other devices or structures.

All of the above mentioned solar heaters utilize an absorber surface that is deformed in some manner. Often, the deformation includes a corrugated member carrying pipes that carry heat absorbing fluids such as air or water. Other types of deformations include the undulated cover member of Cook or the waffled absorber surface of Guba. The primary purpose of these deformed absorber surfaces is to more efficiently trap solar energy by reflecting incident solar radiation several times before it escapes.

In summary, the prior art utilizes a fluid directing means such as pipes or baffles to direct air, water or other heat absorbing fluids across the upper or the lower surface of a deformed absorber. The heated fluid is then used to perform useful work.

In most instances, one solar panel unit does not absorb enough energy to satisfy a user's requirements. To overcome this problem, a plurality of solar collector units are often coupled in series and/or parallel to increase the heat absorbing capacity of the system. In the prior art, such coupling was accomplished by connecting individual panels together with pipes, hoses, conduits or the like which added a great deal to the expense and labor time involved in constructing the solar heating system.

Lastly, solar heater units found in the prior art are relatively complex assemblies of parts and usually cannot be constructed by the use of simple hand tools. This usually precludes the prior art solar heaters from being assembled in the technologically undeveloped areas where solar energy is most sorely needed.

SUMMARY OF THE INVENTION

It is an object of this invention to provide a forced air solar heating system that is simple in design and which is engineered to be easily assembled with common hand tools by relatively untrained labor.

Another important object of this invention is to provide a solar panel unit which can be quickly and easily coupled to other solar panel units without the need for connecting pipes, conduits or the like.

Briefly, our forced air solar heating system comprises: at least one solar panel unit including an elongated base member, an elongated, corrugated absorber member disposed over the base member so that the air space between the absorber member and the base member forms a plurality of isolated channels which extend between the ends of those two members, a first end cap provided with a plurality of apertures that are respectively aligned with the air channels, the first end cap being disposed over the first end of the base and absorber member, a second end cap provided with a plurality of apertures that are respectively aligned with the air channels, the second end cap being disposed over second ends of the base and absorber members, and a translucent covering extending between the first and second end caps to cover the absorber member and to form a dead air space therebetween; an intake manifold coupled to a first end of the first solar panel unit for providing an air flow therethrough; an output manifold coupled to a second end of the first solar panel unit for receiving the air flow; a heat storage unit coupled to the output manifold for receiving the air flow; a heat transferring means for transferring heat stored in the heat storage unit to the air contained by a building; and a blower having an inflow end coupled to the heat storage unit and having an outflow end coupled to the intake manifold for circulating air between the heat storage means and the solar panel units.

A material advantage of our invention is that all of the component parts of our solar panel units are mechanically simple and their assembly into a finished unit is easily accomplished by semiskilled labor with common hand tools.

Another advantage of our invention is that the corrugated absorber member of my invention serves to channel the heat absorbing air without the need for pipes or air baffles.

Another advantageous feature of an embodiment of our invention is that the end caps can be abutted against one another to provide a coupling between adjacent panels without the need for pipes, conduits or their equivalents.

These and other objects and advantages of our present invention will no doubt become apparent to those skilled in the art after having read the following detailed description of the preferred embodiment as accompanied by the several figures of the drawing.

IN THE DRAWING

FIG. 2 is a partially broken perspective view of part of the solar heating system shown in FIG. 1;

FIG. 2a is a partial cross-sectional view taken along line 2a—2a of FIG. 2;

FIG. 4 is a partial cross-sectional view taken along line 4—4 of FIG. 2; and

FIG. 5 is an exploded, partially broken perspective view of an alternate embodiment for a solar panel unit in accordance with our present invention.

DETAILED DESCRIPTION OF THE PREFERRED EMBODIMENT

Figure 1:
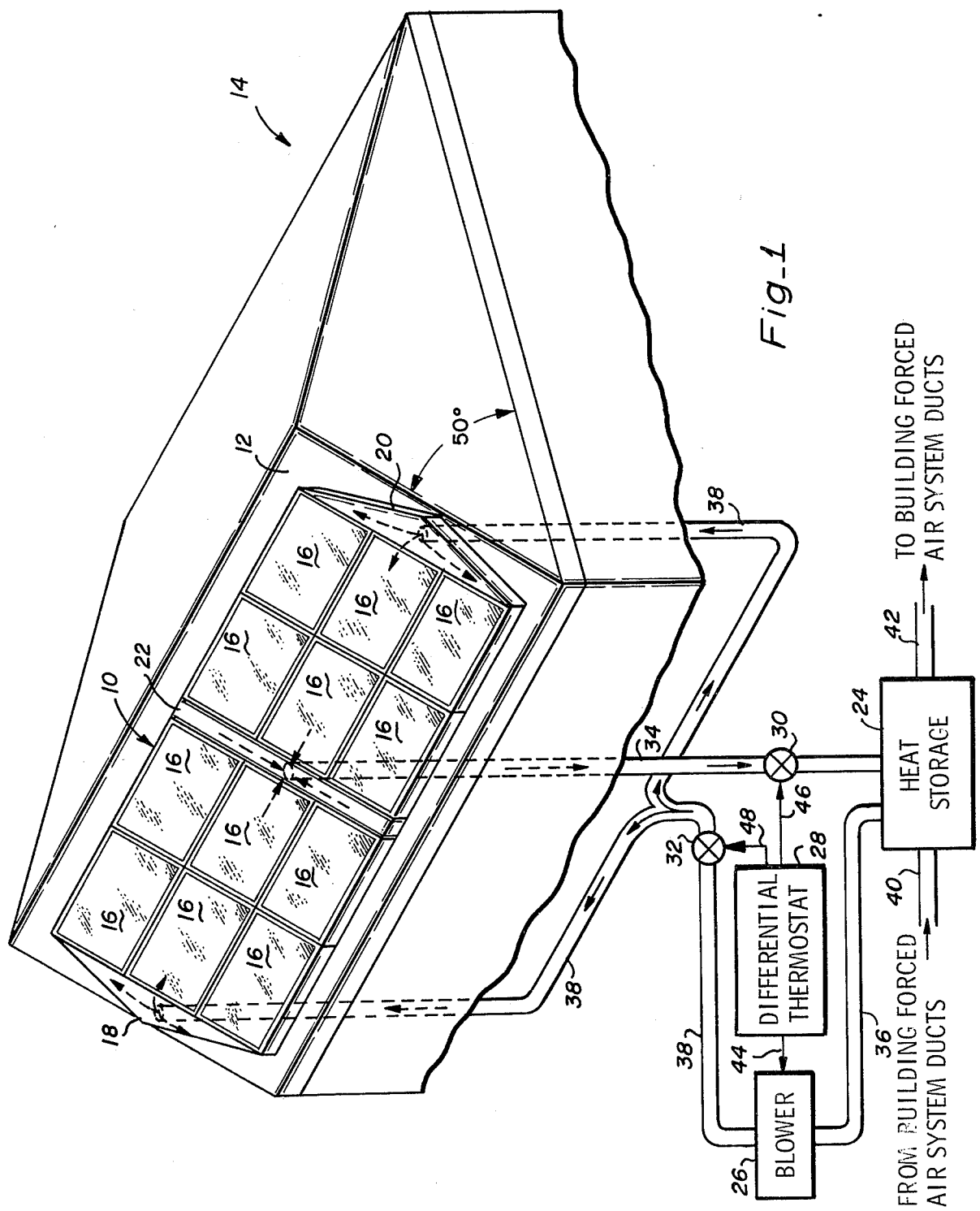
FIG. 1 is a perspective and schematic view of a forced air solar heating system in accordance with our present invention.

In FIG. 1 our forced air solar heating system is shown to include a solar panel assembly 10 attached to a rooftop 12 of a building 14. Solar panel assembly 10 includes a plurality of solar panels 16, a pair of intake manifolds 18 and 20 and an exhaust manifold 22. Also included in our system is a heat storage unit 24, a blower 26, a differential thermostat 28 and a pair of electrically actuated dampers 30 and 32. Intake manifolds 18 and 20 supply pressurized air to the ends of a plurality of solar panel units 16 to cause air to flow through the units and into an exhaust manifold 22. Ducting in our system includes a conduit 34 which couples exhaust manifold 22 to heat storage unit 24, a conduit 36 which couples heat storage unit 24 to the blower, and a Y-shaped conduit 38 which connects the output of the blower to intake manifolds 18 and 20. When blower 26 is actuated, air is drawn from the heat storage unit and is forced through conduit 38 into the intake manifolds and from there through the solar panel units, into the exhaust manifold and through conduit 34 back into the heat storage unit. Air can thus be recirculated continuously through our system so that solar energy can be collected at the rooftop and stored in heat storage unit 24.

The heat stored in storage unit 24 may be utilized to heat the air contained in a building by circulating air from a forced air system duct at 40 through heat storage unit and returning the air to the forced air system ducts at 42. The air from the building's forced air system ducts may gain heat from the heat storage unit by air mixing with the air flowing through the solar panels or the forced air may alternatively become heated by thermal exchange within the heat storage unit.

It will be noted that the portion of rooftop 12 that supports the solar assembly 10 is angled approximately 50° relative to ground level. When the solar panel assembly of the present invention faces southwardly and is supported at this inclination, solar energy incident upon the panels will be maximized for the central latitudes of the United States. Of course, the exact angle of inclination for the supporting portions of the roof should be adjusted for the actual latitude in which the solar panel assembly is to be used.

It should also be noted that solar panel assembly 10 could be supported on any suitably angled surface, such as a ground level frame work, and need not be rooftop-mounted.

Differential thermostat 28 is included in our solar heating system to provide control signals to drive dampers that prevent heat loss from heat storage 24 through solar panel assembly 10. Such heat loss could occur for example, at night when no solar energy is available to heat the air flowing through panel assembly 10, or on cold, rainy or cloudy days. At such times, any air forced through the system would radiate the heat stored in the system out of the collectors. Thermostat 28 compares the temperature of heat storage unit 24 and, if the temperature of the air in conduit 34 is higher, turns the blower on via a signal carried by a line 44 and opens dampers 30 and 32 via signals carried by lines 46 and 48, respectively. When the stored heat in heat storage unit 24 is greater than the temperature of the air in conduit 34, the differential thermostat will turn off the blower and electrically close dampers 30 and 32 by means of appropriate signals on lines 44, 46 and 48, respectively.

In FIG. 2, the arrangement of the various component parts of solar panel assembly 10 may be more clearly seen. Each of the panels 16 includes a base portion covered by a corrugated absorber member 50, which is in turn covered by a translucent cover plate 52. The volume of air trapped between member 50 and plate 52 constitutes a thermally insulating "dead air space". The air space between the absorber member and the base member is divided by the corrugations of the absorber member into a plurality of isolated air channels which extend between the ends of the panel units.

Referring now, additionally, to the cross section 2a, end caps 54 are placed over the combined end portions of the base and absorber members to clamp those members together and to provide for the coupling of the ends of adjacent solar panel units together. The end caps 54 are provided with a plurality of apertures 56 which are aligned with respective ones of the plurality of air channels formed between the absorber and base members.

Referring specifically to the cross-sectional view in FIG. 2a, the attachment between adjacent solar panels may be more clearly seen. End caps 54 are, as previously mentioned, disposed over end portions of base member 58 and absorber members 50. Disposed between the ends of absorber member 50 and the end caps 54 are gaskets 60 provided with a plurality of apertures 64 in respective alignment with apertures 56. Translucent cover members 52 can be seen to be attached to end caps 54 by frame members 62.

To connect two solar panels together end-to-end, a sealing gasket 63 having a plurality of apertures 66 that are respectively aligned with apertures 56 and 61 is positioned between the end caps of two abutted solar panel units. The separation between the end caps of the panel units caused by the thickness of gasket 63 may then be sealed by covering it with elongated metallic strips of flashing material 68 and a length of flashing tape 70. When coupled together in this fashion, air can flow between respective channels in adjacent solar panel units with a minimum of heat or pressure loss.

The end caps of the solar panel units can be coupled to intake manifold 20 and exhaust manifold 22 in a manner similar to the coupling between abutted panel units. As seen, intake manifold 20 is provided with a plurality of apertures 72 which align with respective ones of apertures 56 of abutting solar panel units. Output manifold 22 is provided with a plurality of apertures 74 which similarly align with respective apertures 56 of the abutting solar panel units. Apertures 76 align with respective apertures of solar panel units end caps not shown in this figure.

The coupling between the solar panel units and the intake and output manifold are quite similar to that shown in FIG. 2a. Typically, a gasket is placed between the panel units and the manifolds and the separation formed therebetween caused by the thickness of the gaskets are covered by a flashing strip and flashing tape.

The solar panel units and the intake and output manifolds can be attached to the rooftop or other frame or support in many ways. Shown in this figure are a plurality of right-angle brackets 78 which are fastened along one leg to a surface 80 and along the other leg to the panels or to the manifold. Alternate methods for attaching a solar panel assembly to a support surface would include running roofing tar and paper up the edges of the units and manifold, or attaching the solar panel assembly on top of a plurality of spaced slats which would elevate the assembly slightly above surface 80. This latter method would have the advantage of allowing air circulation under the assembly to prevent roof damage due to water collecting under the units.

Figure 3:
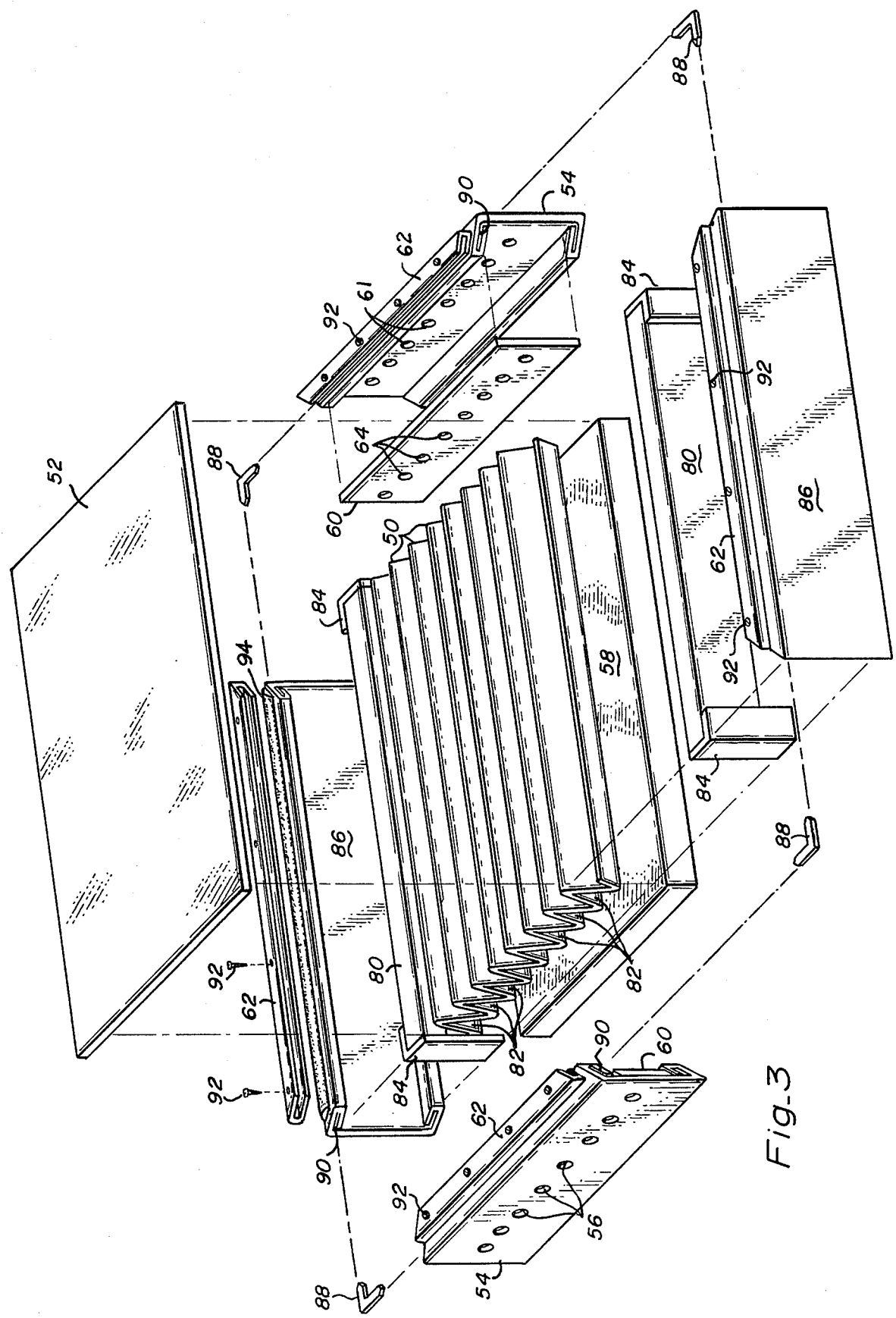
FIG. 3 is an exploded view of a single solar panel unit as shown in FIGS. 1 and 2.

In FIG. 3, a single solar panel unit is shown in an exploded perspective view to show the relationship between the various component parts of the unit. Base member 58 is a rectangular sheet of insulating material which, in my preferred embodiment, is a 1½ to 2 inch thick piece of "THERMAX" covered on a top and a bottom surface with a reflective foil to provide a total insulating factor of R-18. Disposed on top of base 58 is corrugated absorber member 50 which is typically bent and formed from a 0.015 to 0.025 inch thick aluminum sheet or 0.010 to 0.015 inch steel sheet. The absorber member is preferably painted or coated a dark color so as to more efficiently absorb incident solar energy. In this preferred embodiment, a 3 M "NEXTAL" 101-C10 or equivalent coating is applied to both the upper and lower surfaces of the absorber member.

The absorber member is slightly less wide than the width of base member 58 so that a pair of side insulators 80 can flank the absorber without extending beyond the edges of the base member. These side insulators are, in this preferred embodiment, formed from 1½ inch thick pieces of "THERMAX" sheeting covered on opposing sides by reflective foil. When absorber member 50 and the side insulators are disposed on top of base member 58, a plurality of isolated air channels 82 are defined between the absorber unit and the base member.

Four corner seals 84 are placed over the corners of side insulator 80 and base member 58 to prevent any air leakage at those areas. Sealing gaskets 60 are positioned against opposite ends of absorber member 50 and end caps 54 are disposed over opposite ends of the absorber and base members. Apertures 64 of gasket 60 and the apertures 56 of end caps 54 are in alignment with air channels 82 when our panels are assembled as described above.

The end caps are substantially channel-shaped members and are, in this preferred embodiment, constructed from 24-gauge galvanized steel. The depending sides of the channel-shaped end caps are rolled under as illustrated for reasons to be discussed subsequently. A pair of side edge caps 86 are also provided which are disposed over the side edges of base member 58 and the side edges of side insulating members 80. The side edge caps 86 are of substantially the same channel-shape design as the end caps, although the side edge caps are rather more elongated in the preferred embodiment of my invention. The ends of caps 54 and 86 are mitered so that when they are slipped over respective ends and edges of the base and absorber members they form a contiguous surfaced frame work for the entire solar panel unit. The end and side edge caps are held together by four corner clips 88 which are disposed into slots 90 of the cap members defined by the previously mentioned rolled under portions of the cap member.

The frame members 62, which hold translucent cover plate 52 in position over the absorber member, are attached to upper side portions of the cap members by a plurality of screws 92. A sealing gasket material 94 such as "bulb vinyl" may be disposed between frame members 62 and the end caps to prevent thermal loss and air leakage between the frame member and the cap member. When the cover is positioned within the groove of frame member 62 over absorber member 50 the previously mentioned thermally insulating "dead air" space is formed therebetween.

In the cross sectional view of FIG. 4, an assembled solar panel unit is shown. Base member 58 is covered with heat reflective foil 94 on its upper surface and a heat reflective foil 96 on its lower surface. Absorber member 50 and side insulating members 80 (which include heat reflective foil 98 attached to opposing sides) are disposed on top of the base member. Sealing gasket 60 seals the end of absorber member 50 against end cap 54 to prevent heat or air loss. Side edge caps 86 are placed over the side edges of members 58 and 80, and translucent cover member 52 is held in position over the absorber member by frame members 62.

The theory of operation of our solar panel unit is believed to be as follows. When solar radiation "S" passes through translucent cover 52 it will reflect off of corrugated member 50 several times prior to escaping the unit. With each reflection, a fraction of its energy is transferred to the corrugated member in the form of heat. The member 50, in turn, heats air flowing through air chambers 82 to warm the air flowing through my forced air system.

In FIG. 5, an alternate embodiment of our present invention is shown to include a channel-shaped base member 100 having a thermally insulating insert 102, a corrugated absorber member 104 positioned on top of insulating member 102, a translucent covering member 106 supported by frame members 108 and an end cap member 110.

It will be noted that while the ends of base member 100 and absorber member 104 are relatively flush, thermally insulating member 102 is slightly recessed from the ends of those two members. This arrangement allows end cap 110 to plug over the end of the base and corrugated members.

End cap 110 includes a squared, conduit-like exostructure, an integrally formed corrugated member 114, and an integrally formed support structure 116 and web 118. Member 112 has a slot 120 for receiving the edge of base member 100 and a slot 122 for receiving the base member edge of another solar panel or of an intake or output manifold. A portion 124 of the upper part of member 112 is thickened so that when member 110 is plugged into the ends of members 100 and 104, the upper lip portions 125 of end member 110 will lie flush with portion 124. A pair of oppositely facing frame members 108 are provided to hold the edge of translucent covers 106.

Corrugated member 114 is provided with a first slot 126 for receiving the edge of corrugated member 104 and a second slot 128 for receiving the edge of a second solar panel unit absorber member or a specially designed intake or output manifold. Web 118 prevents air flow between coupled solar panels along the upper surface of absorber unit 104 to preserve the insulating "dead air" space discussed earlier.

A plurality of insulating members 130 are provided to inhibit heat loss through the bottom of end cap 110. Insulating members 130 are preferably small pieces of "THERMAX" sheeting which are slipped into spaces in the end cap formed between support structure 116 and outer portion 112.

In use, the end cap of our alternate embodiment can be plugged onto the ends of base member 100 and absorber member 104 and over the ends of a base member and absorber of another solar panel, to quickly, easily and securely couple the two panels together.

While our invention has been described in terms of two preferred embodiments, it is contemplated that modifications thereof will become apparent to those skilled in the art after they have read the preceding detailed description. It is therefore intended that the appended claims cover all such modifications as fall within the true spirit and scope of our invention.

What is claimed is:

1. A forced air solar heating system comprising:
    a first solar panel unit including;
        an elongated base member,
        an elongated, corrugated absorber member disposed over said base member so that the airspace between said absorber member and said base member forms a plurality of isolated air channels which extend between corresponding first and second ends of said base member and said absorber member,
        first end capping means disposed over said first ends of said base and said absorber members, said first end capping means being provided with a first plurality of apertures that are respectively aligned with said plurality of air channels,
        second end capping means disposed over said second ends of said base and said absorber members, said second end capping means being provided with a second plurality of apertures that are respectively aligned with said plurality of air channels,
        means forming side walls extending upwardly from opposed sides of said base member and along the lengths of both said absorber member and said base member, each end of said side walls being joined to a corresponding extremity of the first and second end capping means;
        a translucent covering means extending between said side walls and said first and second end capping means and covering said absorber member to form a sealed dead airspace member;
    a first intake manifold coupled to one end of said first solar panel unit for providing an airflow therethrough;
    an output manifold coupled to another end of said first solar panel for receiving said airflow after it has passed through said air channels;
    heat storage means coupled to said output manifold for receiving said airflow;
    means for transferring heat stored in said heat storage means to the air contained within a building; and
    blower means having an inflow coupled to said heat storage means for receiving said airflow and having an outflow coupled to said intake manifold for supplying said airflow,
    whereby air is recirculated between said heat storage means and said solar panel unit.

2. A forced air solar heating system as recited in claim 1 further comprising:
    a second solar panel unit identical to said first solar panel unit, wherein one end of said second solar panel unit is coupled to said first intake manifold and another end of said second solar panel unit is coupled to said one end of said first solar panel, a second plurality of apertures of said second solar panel unit being aligned with respective ones of said first plurality of apertures of said first solar panel unit.

3. A forced air solar heating system as recited in claim 2 further comprising:
    first sealing means positioned between said other end of said second solar panel unit and said one end of said first solar panel unit.

4. A forced air solar heating system as recited in claim 3 further comprising:
    first means for rigidly attaching said first solar panel unit to said second solar panel unit.

5. A forced air solar heating system as recited in claim 1 further comprising:
    first sealing means positioned between said one end of said second solar panel unit and said first intake manifold; and
    second sealing means positioned between said other end of said first solar panel unit and said exhaust manifold.

6. A forced air solar heating system as recited in claim 5 further comprising:
    means for rigidly attaching said second solar panel unit to said first intake manifold; and
    means for rigidly attaching said first solar panel unit to said exhaust manifold.

7. A forced air solar heating system as recited in claim 1 and further comprising:
    a second solar panel unit identical to said first solar panel unit and coupled at one end to said exhaust manifold, and
    a second intake manifold coupled to another end of said second solar panel for providing an airflow therethrough.

8. A solar panel unit for use in a forced air solar heating system and comprising:
    an elongated base member,
    an elongated, corrugated absorber member disposed over said base member so that the airspace between said absorber member and said base member forms a plurality of isolated air channels which extend between corresponding first and second ends of said base member and said absorber member,
    first end capping means disposed over said first ends of said base and said absorber members, said first end capping means being provided with a first plurality of apertures that are respectively aligned with said plurality of air channels,
    second end capping means disposed over said second ends of said base and said absorber members, said second end capping means being provided with a second plurality of apertures that are respectively aligned with said plurality of air channels,
    means forming side walls extending upwardly from opposed sides of said base member and along the lengths of both said absorber member and said base member, each end of said side walls being joined to a corresponding extremity of the first and second end capping means;
    a translucent covering means extending between said side walls and said first and second end capping means and covering said absorber member to form a sealed dead airspace member;
    whereby when solar energy passes through said translucent covering means to impinge upon said absorber member, said absorber member becomes heated and in turn heats air flowing through said air channels.

9. A solar panel unit for use in forced air solar heating systems as recited in claim 8 wherein said elongated base member includes a thermal insulating material for inhibiting heat loss therethrough.

10. A solar panel unit for use in a forced air solar heating system as recited in claim 8 and further comprising:
 first means for sealing said first end of said absorber member against said first end capping means, and
 second means for sealing said second end of said absorber member against said second end capping means.

* * * * *